Mar. 3, 1925.
O. WINTERHALTER
1,528,286
AUTOMATIC RESISTANCE CONTROL MEANS FOR ELECTRIC MOTORS
Filed Dec. 6, 1921  3 Sheets-Sheet 1
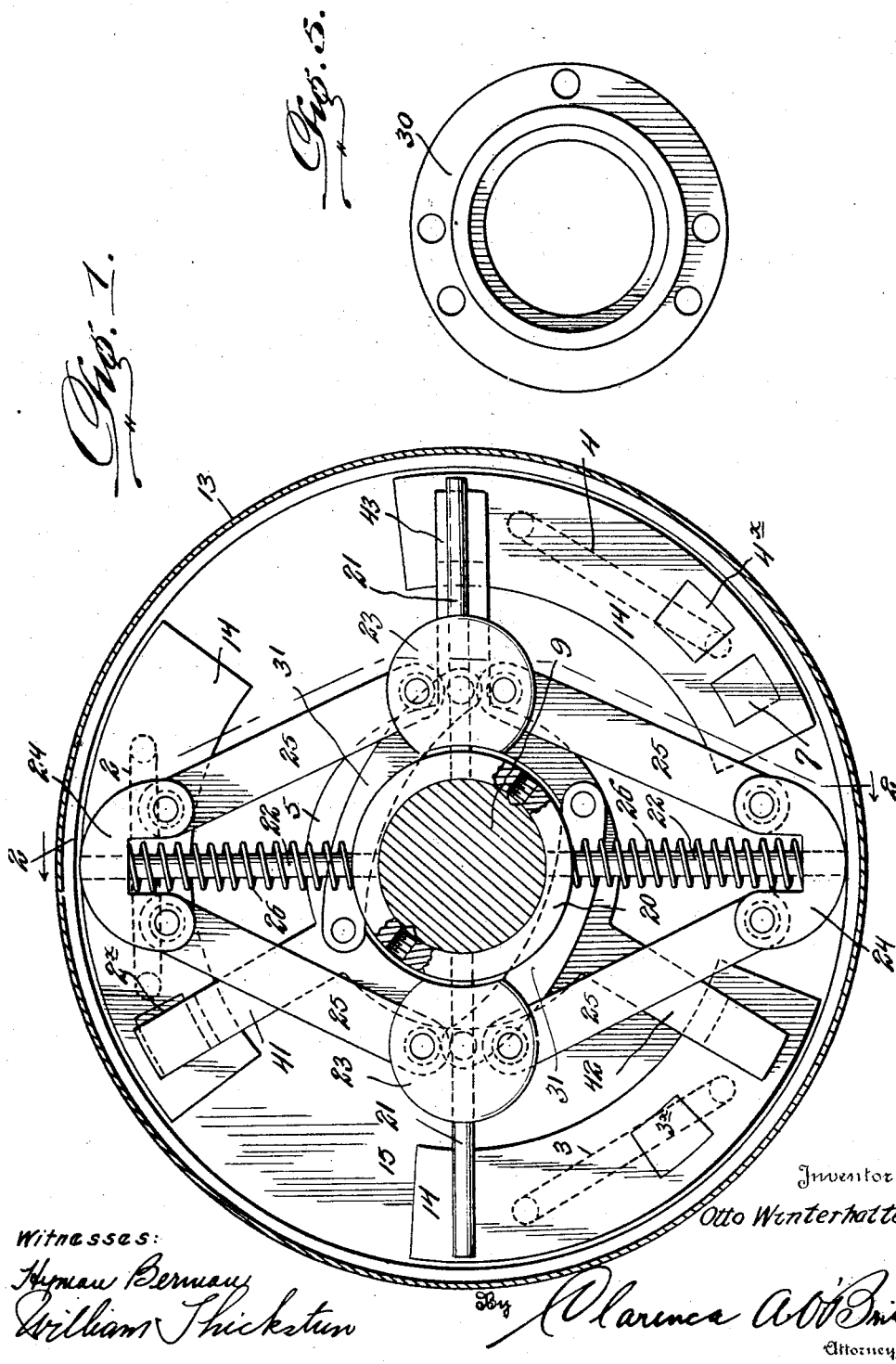
Witnesses:
Inventor
Otto Winterhalter
By Clarence A. O'Brien
Attorney

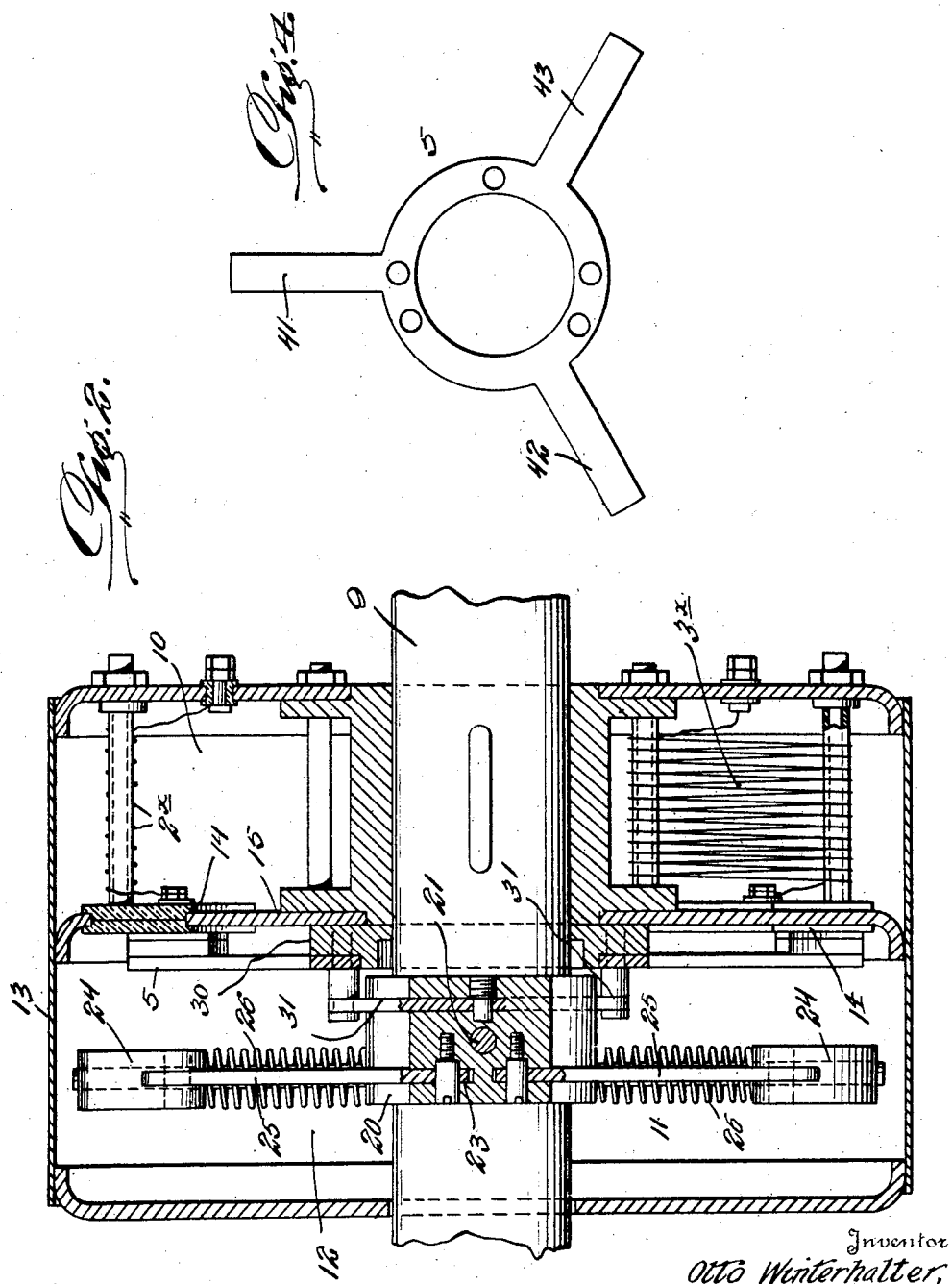

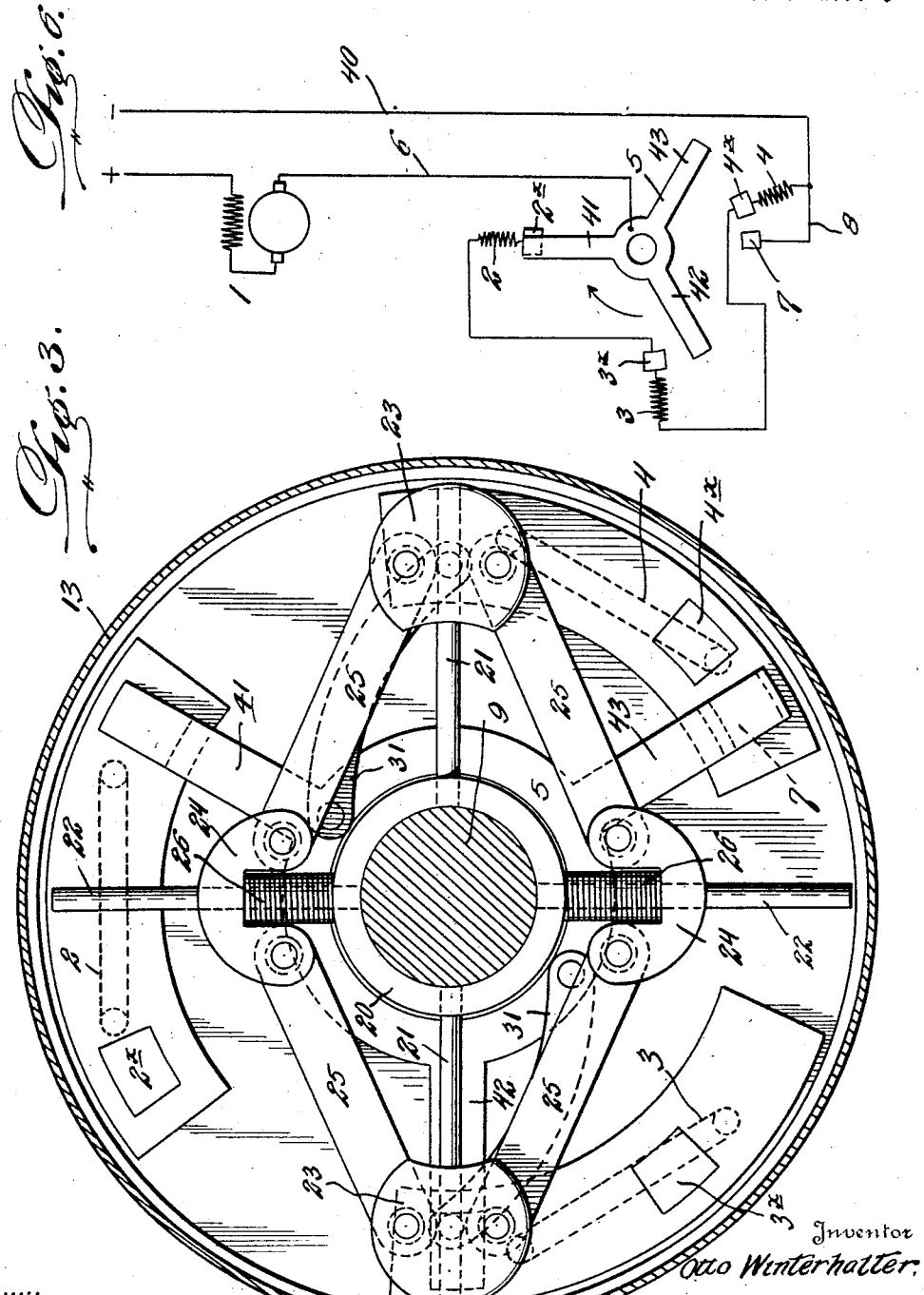

Patented Mar. 3, 1925.

1,528,286

UNITED STATES PATENT OFFICE.

OTTO WINTERHALTER, OF MARYSVILLE, KANSAS.

AUTOMATIC RESISTANCE-CONTROL MEANS FOR ELECTRIC MOTORS.

Application filed December 6, 1921. Serial No. 520,256.

*To all whom it may concern:*

Be it known that I, OTTO WINTERHALTER, a citizen of the United States, residing at Marysville, in the county of Marshall and State of Kansas, have invented new and useful Improvements in Automatic Resistance-Control Means for Electric Motors, of which the following is a specification.

The object of my said invention is the provision of means for the purpose indicated characterized by the utilization of centrifugal force to cut out resistance units and avert the imposition of shock and strain on an electric motor incident to the starting of the motor and as the speed of the motor increases to the maximum and to put in resistance as the motor speed diminishes so that at all times the interposed resistance will be commensurate with the speed of the motor, and the imposition of shock and strain on the motor will be averted.

To the attainment of the foregoing, the invention consists in the improvement as hereinafter described and definitely claimed.

In the accompanying drawings, forming part of this specification:—

Figure 1 is a section showing my improvement at rest.

Figure 2 is a section on the line 2—2 of Figure 1.

Figure 3 is a view similar to Figure 1 but showing the parts of the improvement in the positions they occupy when the motor is running at the maximum speed.

Figure 4 is a detail side elevation of the member operable by centrifugal action for the cutting out of the resistance units.

Figure 5 is a detail side elevation of the hub by which the said member is carried.

Figure 6 is a diagram showing the resistance units of my improvement in series with the electric motor, and also showing the electrical connection to the centrifugally-operable member and the contacts for cooperation therewith.

Similar numerals designate corresponding parts in all of the views.

Reference will first be made to Figure 6 wherein 1 is an electric motor connected as indicated with a source of electric energy and also connected in series with resistance units 2, 3 and 4, respectively, adjacent to and electrically connected with which are contacts 2ˣ, 3ˣ and 4ˣ, respectively. It will also be noted from Figure 6 that the centrifugally-operable element 5 is electrically connected at 6 with the motor 1, and that an additional contact 7 is electrically connected at 8 with one side of the source of electric energy and is adapted to be coupled in series with the member 5 and the motor 1 when all of the resistance units are cut out and the motor is running at high speed.

At 9, Figures 1, 2 and 3, is a shaft which may be the armature shaft of the motor 1, or another shaft appropriately connected to said armature shaft, preferably the former, and by comparison of said figures it will be understood that the resistance units 2, 3 and 4 are carried in a housing 10, fixed to said shaft 9, and that a centrifugal governor 11 is arranged in a housing 12, alongside the housing 10, the two housings 10 and 12 being formed in part by an annular surrounding band 13. The contacts 2, 3, 4 and 7 are carried by appropriate dielectric material 14 at that side of the partition wall 15 adjacent to the housing 12 and are relatively arranged as clearly shown in Figures 1 and 3. The governor 11 in the housing 12 is preferably, though not necessarily, made up of a hub 20 fixed to the axle 9, opposite radial rods 21 on said hub, opposite radial rods 22 on the hub weights 23 movable on said rods 21, bodies 24 movable on the rods 22, links 25 interposed between and connecting the weights 23 and the bodies 24, and coiled springs 26, surrounding the rods 22 and interposed between the hub 20 and the bodies 24 and having for their function to resist inward movement of the bodies 24 so that the outward movement of the weights 23 under the influence of centrifugal force is against the action of the said springs 26. The centrifugally operable member 5 is connected to and carried by a hub 30 loose on the shaft 9, and the said member 5 is connected with the weights 23 through the medium of links 31. From this it follows that when the weights 23 are thrown outward the member 5 will be turned in one direction about the shaft 9 while when the weights 23 are retracted by the expansion of the springs 26, the member 5 will be turned in the opposite direction about the shaft 9.

As hereinbefore indicated Figures 1 and 6 show the parts in the positions they occupy when the motor and the improvement are at rest. Consequently when current is supplied to the motor in starting the same, the circuit will be from the plus pole of the source of energy through the motor, the centrifugally-operable member 5, the contact 2˟, the resistance unit 2, the contact 3˟, the resistance unit 3, the contact 4˟, the resistance unit 4 and the connection 40 in Figure 6 back to the minus pole of the source of energy. As the speed of the motor increases the arm 41 of the member 5 is moved out of engagement with the contact 2˟, and the arm 42 of said member is moved into engagement with the contact 3˟. In this way the resistance unit 2 is cut out. Then as the speed of the motor is further increased, the arm 42 is moved out of engagement with the contact 3˟, and the arm 43 of member 5 is moved into engagement with the contact 4˟. In consequence of this both resistance units 2 and 3 are cut out. Then as the speed of the motor is still further increased, the arm 43 will be moved out of engagement with the contact 4˟ and into engagement with the contact 7, so that all of the resistance units will be cut out and the current will pass from the member 5 through the contact 7 and the connections 8 and 40 back to the minus pole of the source of energy, as is desirable when the motor is running at high speed.

Incident to the stopping of the motor, the operation described is reversed, the resistance being built up step by step until the maximum resistance is interposed by the engagement of the arm 41 of member 5 with the contact 2˟.

It will be manifest from the foregoing that in virtue of the improvement, the amount of current supplied to the motor is at all times commensurate with the speed of the motor, and, therefore, the motor at no time is subjected to shock or strain; also, that in the event of the supply of current being suddenly and completely cut off or suddenly reduced to a minimum, injury to the motor will be effectively prevented.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

An apparatus of the character described comprising a shaft, radially disposed rods mounted upon the shaft, relatively heavy weights slidably mounted upon the rods, links pivotally connected at their inner ends with said weights, relatively light weights pivotally connecting the outer ends of the links, means for guiding the last mentioned weights radially with relation to the shaft, springs interposed between the lighter weights and the shaft, and being under compression with tendency to hold the lighter weights spaced from the shaft, a spider turnably mounted upon the shaft and having a series of radially disposed spaced arms, links operatively connecting the heavier weights with the spider, electric shields disposed in the paths of movement of the arms of the spider and in contact therewith, resistance elements mounted upon the said electric shields and having terminals disposed in the paths of movement of the arms of the spider, the said terminals being spaced from each other circumferentially with respect to the shaft at such intervals that the arms of the spider may encounter the contacts successively but not simultaneously.

In testimony whereof, I affix my signature.

OTTO WINTERHALTER.